(12) United States Patent
Ashikhmin et al.

(10) Patent No.: US 9,425,929 B2
(45) Date of Patent: Aug. 23, 2016

(54) WIRELESS COMMUNICATION WITH SUPPRESSION OF INTER-CELL INTERFERENCE IN LARGE-SCALE ANTENNA SYSTEMS

(71) Applicant: Alcatel-Lucent USA Inc., Murray Hill, NJ (US)

(72) Inventors: Alexei Ashikhmin, Morristown, NJ (US); Thomas L. Marzetta, Summit, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 205 days.

(21) Appl. No.: 14/331,247

(22) Filed: Jul. 15, 2014

(65) Prior Publication Data

US 2015/0381327 A1 Dec. 31, 2015

Related U.S. Application Data

(60) Provisional application No. 62/017,369, filed on Jun. 26, 2014.

(51) Int. Cl.
*H04L 27/28* (2006.01)
*H04L 25/08* (2006.01)
(Continued)

(52) U.S. Cl.
CPC ............ *H04L 5/0032* (2013.01); *H04B 7/0456* (2013.01); *H04B 7/0837* (2013.01); *H04W 52/244* (2013.01)

(58) Field of Classification Search
CPC .. H04L 5/0032; H04B 7/0456; H04B 7/0837; H04W 52/244
USPC ......... 375/260–267, 146–147, 220, 346–347, 375/349
See application file for complete search history.

(56) References Cited

U.S. PATENT DOCUMENTS 7,653,120 B2 1/2010 Chen et al.
8,325,842 B2 * 12/2012 Zhu ...................... H04B 7/0417
375/267

(Continued)

FOREIGN PATENT DOCUMENTS

EP 2129173 A1 12/2009
WO WO2015119745 A1 8/2015

OTHER PUBLICATIONS

Ashikhmin, A., et al. "Pilot contamination precoding in multi-cell large scale antenna systems." Information Theory Proceedings (ISIT), 2012 IEEE International Symposium on. IEEE, 2012, pp. 1137-1141.

(Continued)

*Primary Examiner* — Thai Hoang
(74) *Attorney, Agent, or Firm* — Mendelsohn Dunleavy, P.C.; Steve Mendelsohn (57) ABSTRACT

In exemplary LSAS (large-scale antenna system) networks, uplink signals are processed to compensate for pilot contamination. Slow-fading coefficients are generated for terminals in the wireless network, and postcoding matrices are generated based on the slow-fading coefficients and terminal transmit power levels. Uplink signals are received from the terminals, and M-dimensional postcoding is performed to generate estimated uplink signals from the received uplink signals, where M is the number of antennas at a base station of the wireless network. The postcoding matrices are applied to the estimated uplink signals to compensate for pilot contamination. The improved technique used to generate postcoding matrices depends on whether the M-dimensional postcoding involves matched filtering or zero forcing. Postcoding matrices generated using improved techniques work better than those generated independent of the terminal transmit power levels by inverting slow-fading coefficient matrices for LSAS networks having intermediate numbers (>10 and <1000) of antennas per base station.

16 Claims, 5 Drawing Sheets

(51) Int. Cl.
*H04L 1/02* (2006.01)
*H04L 5/00* (2006.01)
*H04B 7/04* (2006.01)
*H04W 52/24* (2009.01)
*H04B 7/08* (2006.01)

(56) References Cited

U.S. PATENT DOCUMENTS

| | | | |
|---|---|---|---|
| 2005/0136844 A1* | 6/2005 | Giesberts | H04L 1/0015 |
| | | | 455/67.13 |
| 2007/0274411 A1* | 11/2007 | Lee | H04B 7/0671 |
| | | | 375/267 |
| 2008/0299917 A1 | 12/2008 | Alexiou et al. | |
| 2009/0296663 A1 | 12/2009 | Wild | |
| 2010/0144334 A1 | 6/2010 | Gorokhov et al. | |
| 2011/0069746 A1* | 3/2011 | Chockalingam | H04B 7/0669 |
| | | | 375/224 |
| 2011/0080972 A1 | 4/2011 | Xi et al. | |
| 2011/0150111 A1* | 6/2011 | Oyman | H04L 1/0019 |
| | | | 375/260 |
| 2012/0163496 A1* | 6/2012 | Wang | H04L 25/03898 |
| | | | 375/295 |
| 2012/0188889 A1 | 7/2012 | Sambhwani et al. | |
| 2013/0028344 A1* | 1/2013 | Chen | H04B 7/0417 |
| | | | 375/267 |
| 2013/0070621 A1 | 3/2013 | Marzetta et al. | |
| 2013/0107791 A1* | 5/2013 | Oh | H04B 7/0452 |
| | | | 370/312 |
| 2013/0156021 A1 | 6/2013 | Ashikhmin et al. | |
| 2013/0251058 A1* | 9/2013 | Wu | H04B 7/0456 |
| | | | 375/267 |

OTHER PUBLICATIONS

Invitation to Pay Additional Fees and Partial International Search; Mailed Dec. 17, 2015 for PCT Application No. PCT/US2015/036138.

Adhikary, A., et al. "Uplink Interference Reduction in Large Scale Antenna Systems." 2014 IEEE International Symposium on in Information Theory (ISIT), pp. 2529-2533.

Li, L., et al., "Pilot Contamination Precoding for Interference Reduction in Large Scale Antenna Systems," 51st Annual Allerton Conference on Communication, Control, and Computing, Allerton House, UIUC, Illinois, USA, IEEE, Oct. 2-3, 2013, pp. 226-232.

Marzetta, T. L. et al., "Noncooperative Cellular Wireless with Unlimited Numbers of Base Station Antennas," IEEE Transactions on Wireless Communications, Nov. 2010, vol. 9, No. 11, pp. 3590-3600.

International Search Report and Written Opinion; Mailed Feb. 23, 2016 for PCT Application No. PCT/US2015/036138.

\* cited by examiner

WIRELESS COMMUNICATION WITH SUPPRESSION OF INTER-CELL INTERFERENCE IN LARGE-SCALE ANTENNA SYSTEMS

This application claims the benefit of the filing date of U.S. provisional application No. 62/017,369, filed on Jun. 26, 2014, the teachings of which are incorporated herein by reference in their entirety.

FIELD OF THE INVENTION

The invention relates to wireless communication that use multiple antennas to achieve improved network performance.

ART BACKGROUND

It has long been known that techniques of spatial multiplexing can be used to improve the spectral efficiency of wireless networks. (Spectral efficiency describes the transmitted data rate per unit of frequency, typically in bits per second per Hz.) In typical examples of spatial multiplexing, an array of multiple transmit antennas sends a superposition of messages to an array of multiple receive antennas. The channel state information (CSI), i.e., the channel coefficients between the respective transmit-receive antenna pairs, is assumed known. Provided that there is low correlation among the respective channel coefficients, the CSI can be used by the transmitter, or the receiver, or both, to define a quasi-independent channel for each of the transmitted messages. As a consequence, the individual messages are recoverable at the receiving antenna array.

More recently, experts have proposed extensions of the spatial multiplexing technique, in which a multiplicity of mobile or stationary user terminals (referred to herein as "terminals") are served simultaneously in the same time-frequency slots by an even larger number of base station antennas or the like, which we refer to herein as "service antennas", or simply as "antennas". Particularly when the number of service antennas is much greater than the number of terminals, such networks may be referred to as "Large-Scale Antenna Systems (LSAS)".

Theoretical studies predict that the performance of LSAS networks scales favorably with increasing numbers of service antennas. In particular, there are gains not only in the spectral efficiency, but also in the energy efficiency. (The energy efficiency describes the ratio of total data throughput to total transmitted power, and is measured, e.g., in bits per Joule.)

One such study is T. L. Marzetta, "Noncooperative Cellular Wireless with Unlimited Numbers of Base Station Antennas," *IEEE Trans. on Wireless Communications* 9 (November 2010) 3590-3600, hereinafter referred to as "Marzetta 2010" and the teachings of which are incorporated herein by reference in their entirety.

In some approaches, the base stations may obtain CSI through a procedure that relies on time-division duplex (TDD) reciprocity. That is, terminals send pilot sequences on the reverse link (aka the uplink), from which the base stations can estimate the CSI. The base stations can then use the CSI for beam forming. This approach works well when each terminal can be assigned one of a set of mutually orthogonal pilot sequences.

Generally, it is considered advantageous for the mobiles to synchronously transmit all pilot sequences on a given frequency, and possibly even on all frequencies, making use of the mutual orthogonality of the pilot sequences.

The number of available orthogonal pilot sequences, however, is relatively small, and can be no more than the ratio of the coherence time to the delay spread. Terminals within a single cell can use orthogonal pilot sequences, but terminals from the neighboring cells will typically be required to reuse at least some of the same pilot sequences. This reuse of pilot sequences in different cells creates the problem of pilot contamination. Pilot contamination causes a base station to beam-form its message-bearing signals not only to the terminals located in the same cell, but also to terminals located in the neighboring cells. This is so-called directed interference. Directed interference does not vanish as the number of base station antennas grows. In fact, directed inter-cell interference—along with the desired signals—grows in proportion to the number of base station antennas.

As shown in Marzetta 2010, for example, as the number of base station antennas grows in an LSAS network, inter-cell interference arising from pilot contamination will eventually emerge as the dominant source of interference.

U.S. Patent Application Publication No. 20130156021 ("the '021 publication"), the teachings of which are incorporated herein by reference in their entirety, describes an approach that can suppress the inter-cell interference resulting from pilot contamination in uplink signals and thus achieve even greater SINRs. The approach described in the '021 publication involves a zero-forcing slow-fading postcoding (ZF-SFP) technique for generating slow-fading postcoding matrices, that gives very good results when the number of base station antennas is very large, like 10,000 or more. For smaller numbers of antennas, like 100, however, the ZF-SFP technique of the '021 publication does not provide sufficiently good results.

SUMMARY OF THE INVENTION

The approach described in the '021 publication relies on a factoring of the fading coefficients (also referred to here as "channel" or "propagation" coefficients) into two components: a fast-fading coefficient and a slow-fading coefficient (which is also often referred to as a "shadow fading" coefficient).

In implementations of this approach, the beam-forming which each base station performs for forward link (aka downlink) transmissions based on its knowledge of the fast-fading channel to its own terminals is preceded by pilot contamination precoding (PCP). PCP is performed jointly by the base stations, utilizing only the slow-fading components of the channel coefficients. According to this approach, the downlink data destined for all terminals are made available to all base stations, and the slow-fading coefficients between each base station array and each terminal are made available to all base stations. The fading behavior responsible for the slow-fading coefficients changes very slowly compared with fast fading. Slow fading is independent of frequency, and the slow-fading coefficients are substantially equal for all of the antennas in a particular base station array. As a consequence, it is feasible to obtain and to periodically update accurate estimates of the slow-fading coefficients.

PCP anticipates that, in the limit of a large number of antennas, the known precoding technique for beam forming will create composite signals at each terminal. Each such composite signal is a linear combination of the desired message-bearing symbol together with message-bearing symbols that belong to terminals, in other cells, that share the same pilot sequence. The combining coefficients are associated only with slow fading. PCP, jointly over the multiplicity of cells, implements operations to at least partially cancel the cell-to-cell combining of corresponding symbols across cells that would otherwise occur.

Similar principles are applicable and advantageous when applied to the reverse data link (i.e., uplink). In the case of uplink signal processing, each base station performs pilot contamination postcoding (also referred to herein as PCP) to compensate for the effects of pilot contamination.

As the number of base station antennas grows very large, the approach of the '021 publication for both downlink and uplink communications can achieve very high SINR values. However, when the number of base station antennas is relatively small (e.g., tens or hundreds instead of thousands or greater), the performance of the approach of the '021 publication for uplink communications may be unsatisfactory.

The approach of the '021 publication relies on a matrix inversion operation applied to the matrix of slow-fading coefficients to generate PCP matrices used by the base stations to compensate for uplink signal interference resulting from pilot contamination. The present disclosure presents alternative techniques for generating PCP matrices that work better for relatively small numbers of base station antennas than the matrix inversion technique of the '021 publication. Unlike the technique of the '021 publication, these alternative techniques take into account the terminal transmit power levels when generating the PCP matrices. These alternative techniques are referred to herein as improved approaches for generating PCP matrices.

As used herein, a "terminal group" is a reuse group for pilot signals transmitted by terminals, and a "message" is the whole or any portion of a body of data to be transmitted. A message may be encoded in the form of one or more symbols, each symbol having an information content of one or more binary bits.

According to embodiments of both the approach of the '021 publication and the present improved approaches, the base station receives a respective reverse-link signal from each of two or more terminal groups, wherein each said signal is a combination of reverse-link signals synchronously transmitted by a plurality of same-cell and other-cell terminals in the same terminal group. The base station obtains from each of one or more other base stations a further reverse-link signal received by the other base station from each of the terminal groups. The base station linearly combines selected received signals and obtained signals, thereby to recover reverse-link messages transmitted by same-cell terminals in each of two or more terminal groups.

In other embodiments, one or more of the steps described above are performed at nodes of the network (e.g., one or more centralized controllers) that are distinct from the base stations, or are divided among several base stations.

It should be understood that a "module" may be a specialized circuit or combination of circuits, or it may be a set of instructions recorded in a machine-readable memory, together with general-purpose or special-purpose circuitry capable of carrying out the recorded instructions.

In other embodiments, base station apparatus comprises a module adapted for receiving a respective reverse-link signal from each of a plurality of terminal groups, wherein each said signal is a combination of reverse-link signals synchronously transmitted by a plurality of same-cell and other-cell terminals in the same terminal group. The apparatus further comprises a module adapted for obtaining from each of a plurality of other base stations a further reverse-link signal received by the other base station from each of the terminal groups. The apparatus further comprises a module adapted for linearly combining selected received signals and obtained signals, thereby to recover reverse-link messages.

In further embodiments, the base station further comprises a module adapted to linearly combine signals received on the reverse link by said base station with signals received on the reverse link by other base stations of said cellular network, thereby to mitigate interference in said reverse-link signals due to said pilot contamination.

DETAILED DESCRIPTION

A message-carrying signal transmitted from a base station antenna array (downlink) or from a terminal antenna (uplink) during one channel use interval is referred to here as a "symbol". A symbol is distributed in space and frequency, because each base station has multiple antennas for transmission/reception, and because each symbol will typically be distributed over multiple OFDM (orthogonal frequency-division multiplexing) subcarriers or "tones".

Unless specifically referred to as a terminal antenna, the term "antenna" refers to a base station antenna associated with a cell. Each cell has at most M antennas. The term "terminal" refers to a mobile user terminal.

The total number of cells in the wireless network is L. Each cell contains at most K terminals. The total number of pilot signals is K. The pilot signals are numbered $1, \ldots, K$. The pilot signals are assumed to be allocated to terminals such that, in each cell, the k-th terminal is allocated pilot signal k.

Antenna mj is the m-th antenna of cell j. Terminal kl is the k-th terminal of cell l.

For tone n, the channel coefficient between antenna mj and terminal kl is $g_{nmjkl}$. Hereinafter, the tone index n will be suppressed from our notation. An M×K channel matrix $G_{jl}$ is defined between the base station of cell j and the terminals of cell l by:

$$[G_{jl}]_{m_1 k_1} = g_{nmjkl}; m=m_1, k=k_1. \qquad (1)$$

The channel coefficient g may be factored into a fast-fading factor h and a slow-fading factor $\beta^{1/2}$:

$$g_{nmjkl} = h_{nmjkl} \cdot \beta_{jkl}^{1/2} \qquad (2)$$

The h coefficients, which represent fast fading, can change with as little as ¼ wavelength of motion. On the other hand, the fading behavior represented by the β coefficients, is relatively slowly varying. Although the slow-fading β coefficients are often referred to as "shadow" fading coefficients, this fading is typically a combination of geometric attenuation and shadow fading. Typically, slow fading is constant over frequency and slowly varying over space and time. By contrast, fast fading typically changes rapidly over space and time. In frequency, fast fading varies over frequency intervals that are the reciprocal of the channel delay spread. Without loss of generality in our mathematical analysis below, we can make the convenient assumption that the fast-fading h coefficients have unit variance. (We have the freedom to do so because the multiplicative decomposition of g is non-unique.)

It will be seen that the slow-fading coefficient in Equation (2) has been indexed for the base station of cell j and the k-th terminal of cell l. It has not been indexed for an individual antenna of the base station of cell j because the slow-fading coefficients are assumed quasi-independent of spatial location, at least on the spatial scale of an antenna array.

Figure 1:
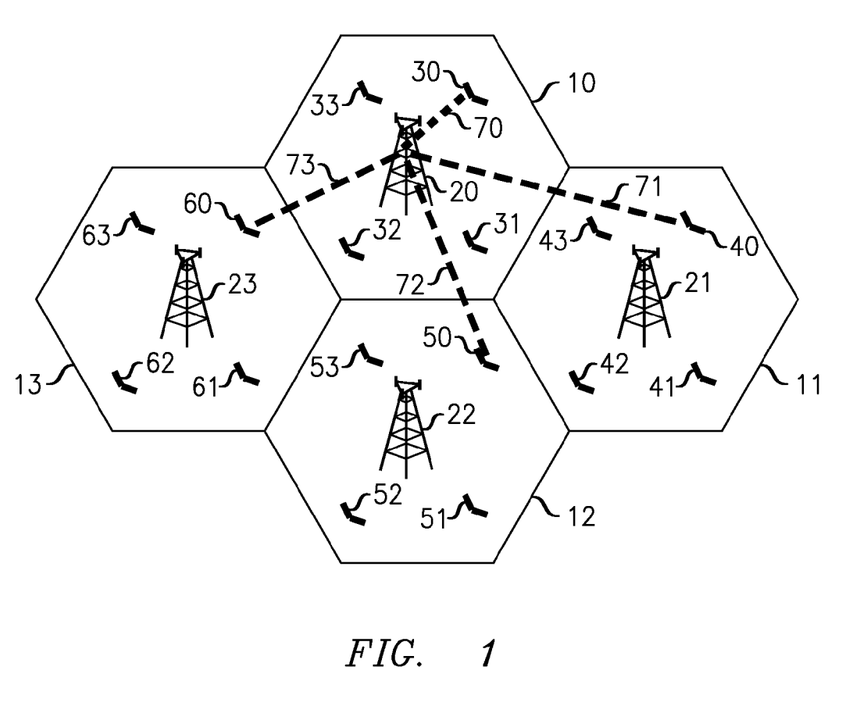
FIG. 1 is a schematic drawing of a portion of an LSAS network, illustrating inter-cell interference due to pilot contamination.

FIG. 1 shows a portion of an exemplary cellular network, including cells 10-13, having respective base stations 20-23. A plurality of mobile terminals is shown in each cell, respectively labeled 30-33, 40-43, 50-53, and 60-63. To simplify the drawing, each of the base stations is treated as having only a single antenna.

In reverse-link (uplink) transmission, terminal 30 transmits a message to base station 20 on path 70. Pilot contamination may cause the reverse-link messages on paths 71-73 to interfere, at base station 20, with the reverse-link message transmitted from terminal 30 on path 70.

Figure 2:
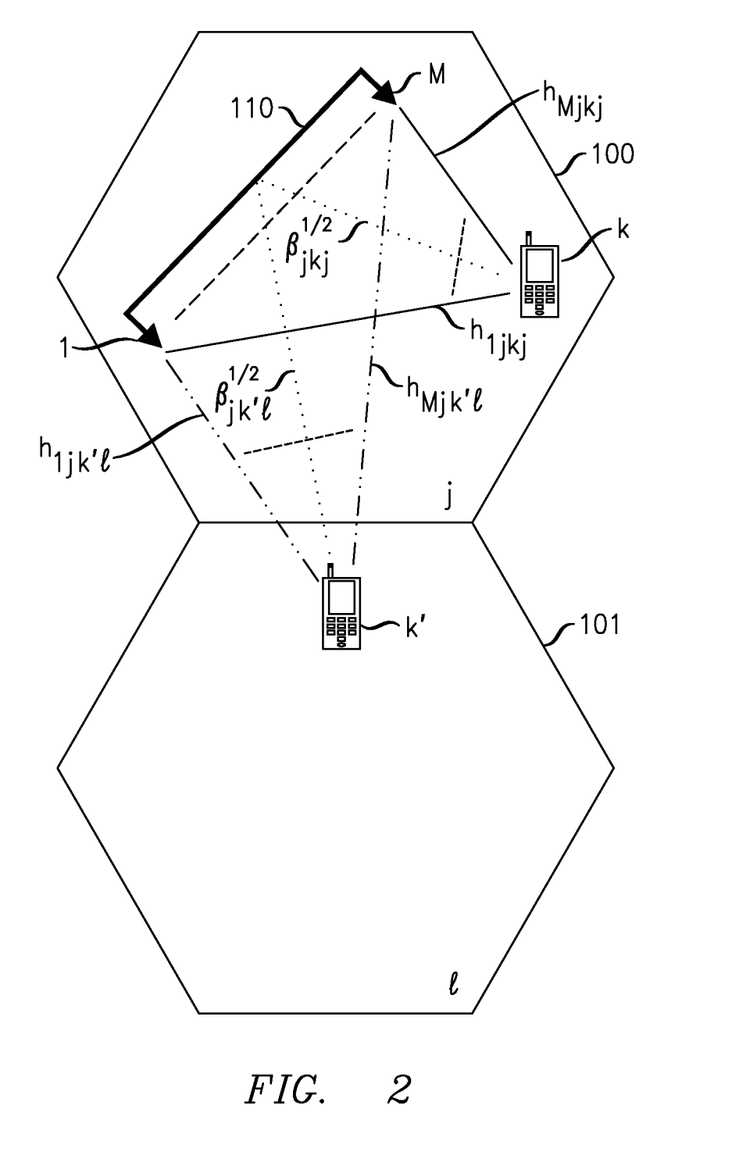
FIG. 2 is a schematic drawing of a portion of an LSAS network, illustrating a distinction between fast-fading coefficients and slow-fading coefficients.

FIG. 2 shows a portion of a cellular network, including cells 100 and 101. To illustrate what is meant by fast-fading and slow-fading coefficients, we have included, in the figure, base station antenna array 110 of cell 100, mobile terminal k of cell 100, and mobile terminal k' of cell 101. To simplify the figure, all other features of the cells have been omitted. As indicated in the figure, cell 100 is cell j for purposes of this illustration, and cell 101 is cell l. Antenna array 110 includes M antennas, of which antenna 1 and antenna M are explicitly represented. Although antenna array 110 is drawn, for convenience, as a linear array, it should be noted that there is no requirement for the geographical distribution of antennas to take a linear shape, or any other particular shape. Likewise, the scale of the linear antenna array has been drawn, solely for convenience, as comparable to the size of the cell. There is no limitation on the geographical scale of the antenna array, except that it will generally be advantageous to space the antennas apart by at least one-half wavelength to minimize the electromagnetic coupling between antennas.

Turning to the figure, it will be seen that propagation paths from terminal k to antenna 1, terminal k' to antenna 1, terminal k to antenna M, and terminal k' to antenna M have been respectively labeled with the fast-fading coefficients $h_{1jkj}$, $h_{1jkl}$, $h_{Mjkj}$, and $h_{Mjkl}$. Two slow-fading coefficients have also been indicated in the figure. They are $\beta_{jkj}^{1/2}$ from terminal k to antenna array 110 of cell j, and $\beta_{jkl}^{1/2}$ from terminal k' of cell l to antenna array 110. Other fast-fading coefficients from the respective terminals to intermediate antennas of array 110 are indicated only by broken lines in the figure.

We assume in the following discussion that OFDM signal modulation is used for reverse-link signals. It should be understood, however, that this disclosure is not limited to OFDM, and techniques may be implemented using other modulation techniques such as time-reversal modulation or CDMA (code-division, multiple-access) modulation.

The number M of antennas per base station may take any value within a wide range. However, fewer than 20 antennas will probably be insufficient to realize the benefits of signal averaging that will be described below. On the other hand, more than 1000 antennas, although advantageous for optimizing performance, will probably be impractical due to limitations of space and cost.

Before describing the approach of the '021 publication and the improved approaches, we will briefly describe the approach for forward-link transmission that is described in Marzetta 2010. As explained there, for forward-link transmissions, each cell transmits an M×1 vector, obtained by applying an M×K precoding matrix to a K×1 vector whose entries are the symbols destined for respective terminals served by that cell. The precoding matrix is the conjugate of the estimated channel matrix within a given cell between the base station antennas and the terminals served by that cell. Thus, the j-th base station transmits $\hat{G}_{jj}^* \bar{a}(j)$, where the first term is the precoding matrix and the second term is the K×1 vector of symbols to be transmitted. The precoding matrix is the M×K matrix given by:

$$[\hat{G}_{jj}^*]_{m_1 k_1} = \hat{g}_{nmjkl}^*; m = m_1, k = k_1, l = j, \quad (3)$$

where, for each (n, m, j, k, l), each entry $\hat{g}_{nmjkl}^*$ is the complex conjugate of an estimate of the $g_{nmjkl}$ given above.

The vector $\bar{a}(j)$ is given by $$\bar{a}(j) = \begin{pmatrix} a_{1j} \\ a_{2j} \\ \vdots \\ a_{Kj} \end{pmatrix}, \quad (4)$$

in which entry $a_{kj}$ is the symbol from the j-th base station that is destined for the k-th terminal within cell j.

The process of estimating the channel matrix is contaminated by pilots from other cells. That is, each measurement of a channel coefficient between a given antenna and a terminal k contains additive contributions due to the channel coefficients between the given antenna and the k-th terminals of other cells. As a consequence, the entries in the matrix estimate $\hat{G}_{jj}^*$ contain pilot contamination.

All of the base stations transmit synchronously. Thus, each terminal receives a sum of the synchronous transmissions from all of the base stations, including the combined effects of the precoding matrix and the physical propagation channel.

That is, if we let $\bar{x}_l$ be the K×1 vector of signals received by the K terminals of cell l, each of those signals being summed over all L base stations, we have $$\bar{x}_l = \sqrt{\rho_f} \sum_{j=1}^{L} G_{jl}^T \left[ \sqrt{\rho_p} \sum_{l'=1}^{L} G_{jl'} + V_j \right]^* \bar{a}_j + \bar{w}_l. \quad (5)$$

In the preceding expression, $\bar{w}_l$ is a vector of uncorrelated noise, $\rho_f$ is a measure of the forward signal-to-noise ratio (SNR), the superscript "T" denotes matrix transposition without conjugation, $V_j$ is an M×K matrix of receiver noise whose components are assumed to be randomly distributed with zero mean, mutually uncorrelated, and uncorrelated with the propagation matrices, and $\rho_p$ is a measure of pilot signal SNR.

We assume that the channel vectors of k-th terminals (that is, the k-th columns of the matrices $G_{jl}$) are quasi-orthogonal. In other words, we assume that, if w and y are the k-th columns of different matrices $G_{jl}$, then $$\left(\frac{1}{M}\right)|w^\dagger y|^2 \approx 0.$$

We believe that such an assumption will generally be justified from the following considerations:

Under the assumption of independent Rayleigh fading, quasi-orthogonality follows by necessity. Even under line-of-sight propagation conditions, however, when independent Rayleigh fading cannot be assumed, the channel vectors can still be assumed to be quasi-orthogonal. That is, if the terminals are randomly located, then all that is required for asymptotic orthogonality is that, for sufficiently large values of M, the typical angular spacing between any two terminals should exceed the angular Rayleigh resolution limit of the array of base station antennas. (As expressed in radians, the angular Rayleigh resolution limit is the wavelength divided by the linear extent of the array).

Those skilled in the art will understand that the assumption of asymptotic orthogonality might not hold if the base station antennas and terminals are in a tunnel or other such region that behaves as a wave guide having a finite number of normal modes, or if there is a so-called keyhole phenomenon, in which all radiation must pass through a small bundle of scatterers.

Under the assumption of asymptotic orthogonality, the preceding expression for $\bar{x}_l$ reduces, for large M, to a simpler expression because, in the limit of large M, all interference vanishes except for residual interference due to inter-cell coupling via the slow-fading coefficients. This coupling causes the k-th terminal in each cell to suffer interference only from symbols destined for the k-th terminals of other cells. As a consequence, the k-th terminal in the l-th cell receives the signal $\bar{x}_{kl}$, in which $$\frac{1}{M\sqrt{\rho_p \rho_f}} \bar{x}_{kl}$$

is given by:

$$\sum_{j=1}^{L} \beta_{jkl} a_{kj} = (\beta_{1kl}, \beta_{2kl}, \ldots, \beta_{Lkl}) \cdot \begin{pmatrix} a_{k1} \\ a_{k2} \\ \vdots \\ a_{kL} \end{pmatrix}, \quad (6)$$

where $a_{k1}$ is the symbol destined for the k-th terminal of cell 1, $a_{k2}$ is the symbol destined for the k-th terminal of cell 2, etc.

We now define a matrix S of message-bearing symbols by $[S]_{kj} = a_{kj}$, where, as above, $a_{kj}$ is the symbol from the j-th base station that is destined for the k-th terminal within cell j. Writing the matrix out explicitly yields:

$$\begin{bmatrix} a_{11} & a_{12} & \ldots & a_{1j} & \ldots & a_{1L} \\ a_{21} & a_{22} & \ldots & a_{2j} & \ldots & a_{2L} \\ \vdots & \vdots & \ldots & \vdots & \ldots & \vdots \\ a_{k1} & a_{k2} & \ldots & a_{kj} & \ldots & a_{kL} \\ \vdots & \vdots & \ldots & \vdots & \ldots & \vdots \\ a_{K1} & a_{K2} & \ldots & a_{Kj} & \ldots & a_{KL} \end{bmatrix}. \quad (7)$$

It will now be seen that the second multiplicative term on the right-hand side of the above expression for $$\frac{1}{M\sqrt{\rho_p \rho_f}} \bar{x}_{kl}$$

is the k-th column of the matrix $S^T$, where the superscript "T" denotes matrix transposition without conjugation.

More generally, the respective signals received by the k-th terminals in all cells are expressed (neglecting, to simplify the expressions, the factor $M\sqrt{\rho_p \rho_f}$) in an L×1 vector given by the product:

$$B(k) \cdot \begin{pmatrix} a_{k1} \\ a_{k2} \\ \vdots \\ a_{kL} \end{pmatrix}, \text{ where } B(k) = \begin{pmatrix} \beta_{1k1} & \beta_{2k1} & \ldots & \beta_{Lk1} \\ \beta_{1k2} & \beta_{2k2} & \ldots & \beta_{Lk2} \\ \vdots & \vdots & \vdots & \vdots \\ \beta_{1kL} & \beta_{2kL} & \ldots & \beta_{LkL} \end{pmatrix}. \quad (8)$$

Accordingly, it will be seen that the above expression for $$\frac{1}{M\sqrt{\rho_p \rho_f}} \bar{x}_{kl}$$

is the scalar product of the l-th row of the slow-fading matrix B(k) times the k-th column of $S^T$.

Now define a pilot contamination precoding matrix $A(k) = f[B(k)]$, where $f[\cdot]$ denotes matrix inversion or another function for obtaining a precoding matrix that minimizes interference and maximizes the power of useful signals. One alternative to matrix inversion, known to those skilled in the art, is the nonlinear precoding technique often referred to as dirty paper precoding.

Various other alternatives to matrix inversion are known. For example, a technique for obtaining a precoding matrix to be used in beamforming is described in C. B. Peel et al., "A vector-perturbation technique for near-capacity multiantenna multiuser communication-part I: Channel inversion and regularization," *IEEE Transactions on Communications* 53 (Jan. 2005) 195-202, the teachings of which are incorporated herein by reference. Another such technique is described in H. Vikalo et al., "Rate maximization in multi-antenna broadcast channels with linear preprocessing," *IEEE Transactions on Wireless Communications* 5 (September 2006) 2338-2342, the teachings of which are incorporated herein by reference.

Let the entries in A(k) be designated by:

$$A(k) = \begin{pmatrix} {}^k A_{11} & {}^k A_{12} & \ldots & {}^k A_{1L} \\ {}^k A_{21} & {}^k A_{22} & \ldots & {}^k A_{2L} \\ \vdots & \vdots & \vdots & \vdots \\ {}^k A_{L1} & {}^k A_{L2} & \ldots & {}^k A_{LL} \end{pmatrix} = \begin{pmatrix} {}^k A_1 \\ {}^k A_2 \\ \vdots \\ {}^k A_L \end{pmatrix} \quad (9)$$

The following introduces the approach of the '021 publication as well as the improved approaches of this disclosure, all of which deviate from the procedure described in Marzetta (2010).

Forward Link

As described previously, the j-th base station transmits $\hat{G}_{jj}^* \bar{a}(j)$, where the first term is the precoding matrix and the second term is the vector of symbols to be transmitted, i.e., $$\overline{a}(j) = \begin{pmatrix} a_{1j} \\ a_{2j} \\ \vdots \\ a_{Kj} \end{pmatrix}.$$

Now define $$s(k) = \begin{pmatrix} a_{k1} \\ a_{k2} \\ \vdots \\ a_{kL} \end{pmatrix},$$

where entry $a_{kj}$ is defined as above, and S(k) is the k-th column of $S^T$.

Under the procedure of the '021 publication, by contrast, the j-th base station transmits $\hat{G}_{jj}{}^*\overline{c}(j)$, where:

$$\overline{c}(j) = \begin{pmatrix} c_1(j) \\ c_2(j) \\ \vdots \\ c_K(j) \end{pmatrix}, \quad (10)$$

and entry $c_k(j)$ is defined by:

$$c_k(j) = {}^k\underline{A}_j \cdot s(k). \quad (11)$$

Stated differently, $$\overline{c}(j) = \text{diag}\left[\begin{pmatrix} {}^1\underline{A}_j \\ {}^2\underline{A}_j \\ \vdots \\ {}^K\underline{A}_j \end{pmatrix} S^T\right], \quad (12)$$

where, as will be understood from the preceding discussion, ${}^k\underline{A}_j$ is the j-th row of the matrix A(k), and, for any square matrix M, diag(M) is the vector whose entries are the diagonal entries of the matrix M.

For complete cancellation of interference due to pilot contamination on the forward link, it is desirable to make the transmit power of the j-th base station proportional to the squared norm of the vector $\hat{G}_{jj}{}^*\overline{c}(j)$. In other words, the transmit power of the j-th base station will be $P_j = \rho_j \|\hat{G}_{jj}{}^*\overline{c}(j)\|^2$, where $\rho_j$ is a scaling factor that is uniform for all base stations. Other factors may dictate that the transmit power of a given base station must deviate from $P_j$, but even under such non-ideal circumstances, we believe it will be rare for such deviations to be substantial. In the event that there are substantial deviations, they should be expected to result in inter-cell interference.

The slow-fading coefficients $\beta_{jkl}$ can be estimated without great difficulty, because, generally, they may be assumed constant over the M base station antennas, over frequency, and over at least several timeslots. The following provides one exemplary procedure for estimating the slow-fading coefficient between each terminal in every cell and every base station antenna array.

One or more OFDM symbols are dedicated for slow-fading coefficient estimation. Typically, about 1400 distinct tones will be available per OFDM symbol. (This estimate assumes a 20-MHz bandwidth and a symbol duration of $$\frac{2}{3} \times 100 \text{ microseconds.})$$

Each terminal is assigned a different one of the available tones. A global enumeration is imposed on all of the terminals, across all cells, so that each terminal has a unique sequential number q. Now, for all q, the q-th terminal sends a pilot signal in the q-th tone.

Suppressing for now the cell index j and the terminal index k, and assuming that the pilot sequence has unit power, we can state that a base station receives at the m-th antenna, on the q-th tone, the signal $x_m(q) = g_m(q) = \sqrt{\beta} h_m(q)$, where $g_m(q)$ is the channel coefficient on tone q between the m-th base station antenna and the q-th terminal. As explained above, $g_m(q)$ may be factored into a fast-fading coefficient $h_m(q)$ and a slow-fading coefficient $\sqrt{\beta}$ that is approximately independent of q and m. As noted above, we can assume without loss of generality that h randomly distributed with unit variance. Hence, we can estimate $\beta$ as $$\beta \cong \frac{|x_1|^2 + |x_2|^2 + \ldots + |x_M|^2}{M}.$$

Typically, the terminals will transmit their pilot signals synchronously. To improve the estimates, multiple tones may be assigned to each terminal and averaging may be performed over the tones. Likewise, averaging may be performed over multiple OFDM symbols.

If the terminals use a multiplicity of n OFDM symbols to transmit their pilots, then the same tone can be shared among n terminals, provided the n terminals are transmitting mutually orthogonal sequences of n symbols in a given tone. In such a case, the total number of terminals that can be served (for the purpose of $\beta$ coefficient estimation) is the product of the number of available tones times the pilot length, e.g., 1400n in the above example.

Mobile terminals that are sufficiently distant from each other that their mutual interference is negligible can reuse the same tone and the same pilot sequence.

If cell j has a very large antenna array, then the assumption of spatial quasi-independence may fail. In such a case, it will be advantageous to partition the array of, e.g., M antennas into two or more sub-arrays of respectively $M_1$ antennas, $M_2$ antennas, etc., over each of which the assumption is valid. Then, each slow-fading coefficient is advantageously estimated as a weighted average $\beta_{jkl}^{ave}$, given by:

$$\beta_{jkl}^{ave} = \frac{1}{M} \sum_{w=1}^{W} M_w \beta_{jkl}^w,$$

where $$\sum_{w=1}^{W} M_w = M,$$

and $\beta_{jkl}^w$ is the slow-fading coefficient as estimated for the w-th sub-array.

Typically, it will also be desirable to obtain an estimate of the background noise variance. This may be used for estimating the signal-to-noise ratio, which may be used in turn for determining appropriate data transmission rates, optimizing power allocations, and the like. The background noise variance can be estimated, for example, during an OFDM symbol interval in which all the terminals are silent.

Figure 3:
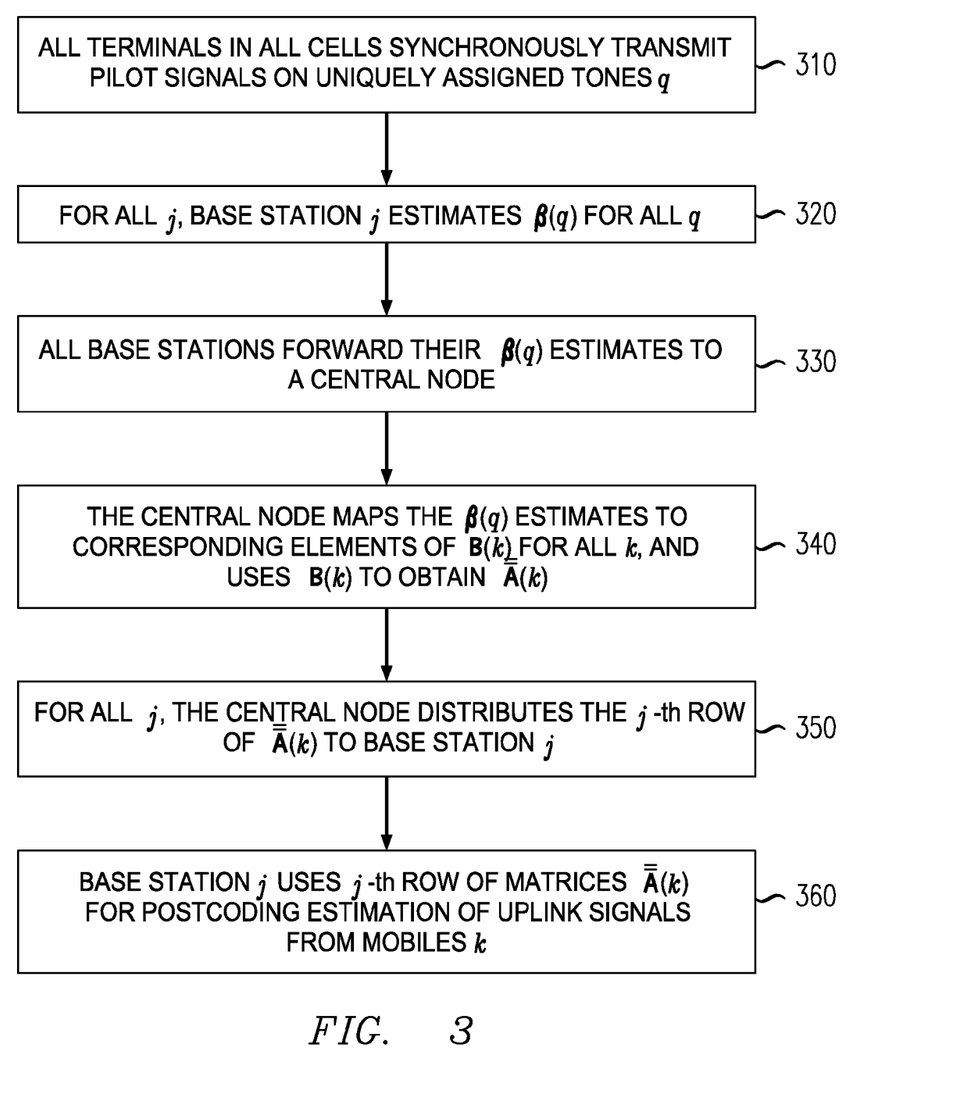
FIG. 3 is a flowchart illustrating one exemplary method for acquiring slow-fading coefficients for use in implementations of the approach of the '021 publication.

The preceding discussion is summarized in FIG. 3, which illustrates one possible procedure for estimating the slow-fading coefficients and a number of different procedures for obtaining the columns of the matrices A(k). The illustrated procedures are provided as examples only and are not meant to be limiting.

Turning now to FIG. 3, it will be seen that, at step 310, all terminals in all cells synchronously transmit their pilot signals on their respective, uniquely assigned tones q. At step 320, each of the base stations estimates the slow-fading coefficients between itself and each of the (at most) KL terminals. At step 330, all of the base stations forward their estimates β(q) to a central node of the network.

In an LTE (Long Term Evolution) network, for example, one base station, e.g., one eNode-B, may be selected to serve as the central node. Other possibilities will be discussed below.

At step 340, a server at the central node maps the channel estimates β(q) to the corresponding elements of the slow-fading matrix B(k) for each terminal group k. For each terminal group, the server uses B(k) to obtain the corresponding pilot contamination postcoding matrix A(k). According to the approach of the '021 publication, the server inverts B(k) to obtain the corresponding PCP matrix A(k). According to the improved approaches of this disclosure, the server implements techniques other than the simple inversion of the slow-fading matrix B(k) to generate the corresponding PCP matrix A(k).

At step 350, the server distributes a respective row of A(k) to each of the base stations j, j=1, . . . , L. That is, base station j receives the j-th row of each of the K PCP matrices.

At step 360, base station j uses the j-th row of A(k) for postcoding estimation of uplink signals from mobile k.

As noted above, one base station may serve as the central node. More specifically, one eNode-B may serve as the central node in a network in which all of the base stations are eNode-Bs in mutual communication over X2 interfaces.

In another example, the network includes 3GPP base stations of various kinds, which may include, e.g., any combination of LTE, WCDMA, and UMTS base stations. Each such base station has an interface to a Serving Gateway (SGW), through which it communicates with other 3GPP base stations of various kinds. In such a network, the central node functionality may advantageously reside at the SGW, which lies within the core network.

In another example, the network includes both 3GPP base stations and base stations belonging to non-3GPP technologies such as CDMA or DO. There, the central node functionality advantageously resides at the PDN Gateway (PGW), which also lies within the core network.

On the reverse link, the j-th base station receives, in one symbol interval and within each tone, an M×1 vector which constitutes, at each antenna of the base station, a sum of the transmissions from all of the terminals in all L of the cells. The received vector $\bar{x}(j)$ is given by the following expression, in which we continue to suppress an explicit representation of the dependence on the tone index n:

$$\bar{x}(j) = \sqrt{\rho_r} \sum_{l=1}^{L} G_{jl} \bar{a}(l) + \bar{w}(j), \quad (13)$$

where $\rho_r$ is a measure of signal-to-noise ratio, $\bar{a}(l)$ is the K×1 vector of symbols $$\begin{pmatrix} \bar{a}_{1l} \\ \bar{a}_{2l} \\ \vdots \\ \bar{a}_{Kl} \end{pmatrix}$$

from the terminals of the l-th cell, and $\bar{w}(j)$ is a vector of receiver noise whose components are assumed to be zero-mean, mutually uncorrelated, and uncorrelated with the channel matrices. $G_{jl}$ is the M×K channel matrix given above.

In certain embodiments, the base station processes its received signal using the well-known technique of maximum-ratio combining. In other embodiments, the base station processes its received signal using zero forcing. In maximum-ratio combining, the processed signal, represented by the K×1 vector $\bar{y}(j)$, is obtained by multiplying $\bar{x}(j)$ by the conjugate transpose of the channel estimate $\hat{G}_{jj}$:

$$\bar{y}(j) = \quad (14)$$

$$\frac{1}{M} \hat{G}_{jj}^\dagger \bar{x}(j) = \frac{1}{M} \left[ \sqrt{\rho_p} \sum_{l_1=1}^{L} G_{jl_1} + V(j) \right]^\dagger \left[ \sqrt{\rho_r} \sum_{l_2=1}^{L} G_{jl_2} \bar{a}(l_2) + \bar{w}(j) \right].$$

We recall here that the channel coefficient g is factored into a fast-fading factor h and a slow-fading factor $\beta^{1/2}$; i.e., $g_{nmjkl} = h_{nmjkl} \cdot \beta_{jkl}^{1/2}$.

We observe that, in the expansion of the product defined by the above equation, each additive term is proportional to an inner product between two M-component random vectors due to respective columns of the channel matrix $G_{jl}$. Insofar as our assumption of asymptotic orthogonality is accurate, the effects of fast fading and random noise will tend to average out as M increases without bound, and the summation will tend toward a limiting expression, such that the k-th component of $\bar{y}(j)$ is given (in the limit of large M) by:

$$\bar{y}_{kj} = \sqrt{\rho_p \rho_r} \sum_{l=1}^{L} \beta_{jkl} \bar{a}_{kl}. \quad (15)$$

More generally, let us define the K×L matrix Y by $[Y]_{kj} = \bar{y}_{kj}$, where the vector $\bar{y}(j)$ is the j-th column of Y, which is referred to as the received reverse-link signal matrix. The element in row k and column j of matrix Y is the cumulative message received from terminal group k by base station j. Thus, it will be understood that the j-th column of Y consists of the cumulative messages from the respective terminal groups received by base station j.

We now define the L×L matrix $\bar{B}(k)$ by:

$$\bar{B}(k) = B^T(k) = \begin{pmatrix} \beta_{1k1} & \beta_{1k2} & \cdots & \beta_{1kL} \\ \beta_{2k1} & \beta_{2k2} & \cdots & \beta_{2kL} \\ \vdots & \vdots & \vdots & \vdots \\ \beta_{Lk1} & \beta_{Lk2} & \cdots & \beta_{LkL} \end{pmatrix} \quad (16)$$

Now let us define the vector $\bar{c}(k)$ as the k-th row of Y. Let us define the vector $\bar{b}(k)$ as the L×1 vector consisting of the signals transmitted by the respective terminals of group k, i.e., $$\bar{b}(k) = \begin{pmatrix} \bar{a}_{k1} \\ \bar{a}_{k2} \\ \vdots \\ \bar{a}_{kL} \end{pmatrix}. \quad (17)$$

It will be seen from the preceding expressions that, under our approximation for large M, the k-th row of Y is given by:

$$\bar{c}(k) = \sqrt{\rho_p \rho_r} \cdot [\bar{B}(k)\bar{b}(k)]^T. \quad (18)$$

It will be understood that the k-th row of Y consists of the cumulative messages received from terminal group k by the respective base stations.

Each base station will seek to recover the reverse-link symbol destined for it that is transmitted by each terminal in its service area. That is, the base station of cell j will seek to recover the respective symbols $\bar{a}_{kj}$, k=1, . . . , K, transmitted from the K terminals served by the cell.

To achieve this, the base stations exchange information so that the matrix Y is known to all of the base stations. Communication channels provided by the backhaul may be used for such purpose, for example.

For each terminal group k, the slow-fading matrix $\bar{B}(k)$, or equivalently, its transpose B(k), may be obtained by a central node as described above.

For all values of j, the base station of cell j distributes, to all other base stations, the values $\bar{y}_{kj}$, k=1, . . . , K. Stated differently, the base station of cell j distributes $\bar{y}(j)$ to the base stations of all the other cells so that each cell can construct for itself the full received reverse-link signal matrix Y.

We now define a pilot contamination postcoding matrix $\bar{A}(k) = f[\bar{B}(k)]$, where $f[\cdot]$ denotes a function for obtaining a postcoding matrix that reduces interference and increases the power of useful signals. The function $f[\cdot]$ corresponds to inversion of the slow-fading matrix $\bar{B}(k)$ in the approach of the '021 publication and to other techniques described further below for the improved approaches of the present disclosure. The postcoding matrices may, for example, be computed by a server at the central node and distributed from there to the base stations.

For each value of k, each base station computes $\bar{A}(k)$ $[\bar{c}(k)]^T = \bar{A}(k) \cdot \sqrt{\rho_p \rho_r} \cdot \bar{B}(k)\bar{b}(k) \cong \bar{b}(k)$ to recover the values $\bar{a}_{k1}$, $\bar{a}_{k2}, \ldots, \bar{a}_{kL}$. Thus, in particular, the base station of cell j will recover the values $\bar{a}_{1j}, \bar{a}_{2j}, \ldots, \bar{a}_{Kj}$.

Figure 4:
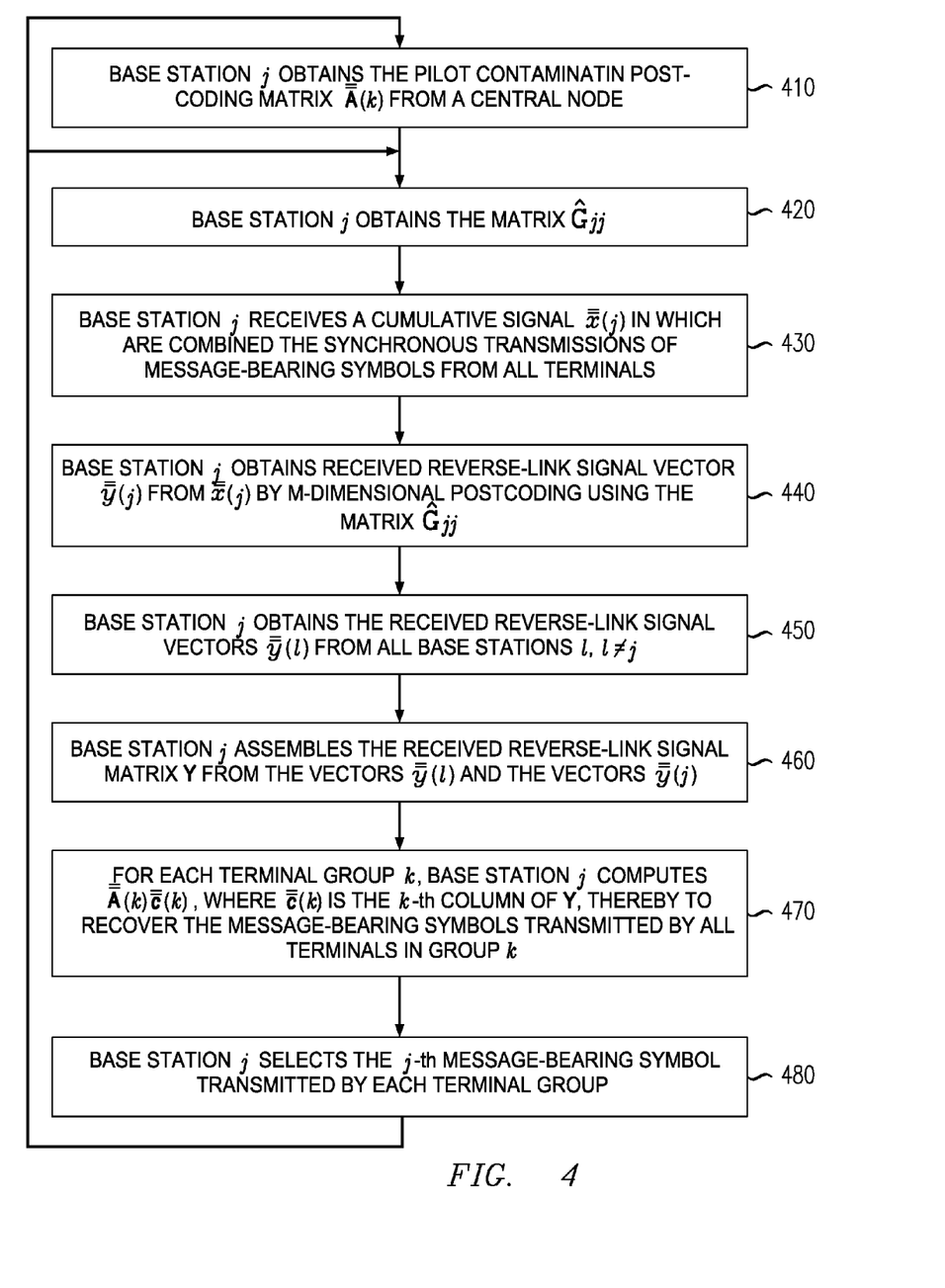
FIG. 4 is a flowchart illustrating the processing of reverse-link signals by a base station, according to an embodiment of the approach of the '021 publication.

The various operations described above, as performed by a base station, are summarized in FIG. 4. The steps illustrated in FIG. 4 are directed to one representative base station, namely base station j, but it will be understood that the same steps are to be performed by each of the L base stations in the network. The steps as illustrated in FIG. 4 are meant to be exemplary and not limiting.

At step 410, base station j obtains the pilot contamination postcoding matrix $\bar{A}(k)$ from the central node. At step 420, the base station obtains the matrix $\hat{G}_{jj}$, whose elements are the estimates of the propagation coefficients between the antennas of base station j and the terminals that it serves. It will be seen in FIG. 4 that $\bar{A}(k)$ and $\hat{G}_{jj}$ may be updated on different cycles. That is because $\bar{A}(k)$ is based solely on slow-fading coefficients which, as noted above, need to be updated no more often than once per multiple symbol intervals. The estimation of $\bar{G}_{jj}$ by the base stations has been discussed above.

At step 430, each antenna of the base station receives synchronous reverse-link transmissions from all (at most) KL terminals in the network. Accordingly, the signal $\bar{x}(j)$ is a vector having M elements, each of which is a cumulative signal that combines the transmitted message-bearing symbols from all of the transmitting terminals.

At step 440, base station j processes the raw signal $\bar{x}(j)$ with an M-dimensional postcoding technique such as maximum ratio combining or zero forcing, using $\hat{G}_{jj}$, to obtain the received reverse-link signal vector $\bar{y}(j)$. It will be understood that $\bar{y}(j)$ is a column vector having K elements, each of which is a cumulative signal that combines all transmitted message-bearing symbols from one of the K terminal groups.

At step 450, the base station obtains the counterpart reverse-link signal vectors $\bar{y}(l)$ from all other base stations, i.e., from base stations l, l=1, 2, . . . , L, l≠j. At step 460, the base station assembles the received reverse-link signal matrix Y from all of the reverse-link signal vectors, i.e., from the abovesaid vector $\bar{y}(j)$ and the abovesaid vectors $\bar{y}(i)$. It will be understood that each of said reverse-link signal vectors constitutes a column of Y, there being a correspondence between respective cells and respective columns of Y.

At step 470, base station j selects each of the rows of Y in turn. The base station transposes each row $\bar{c}(k)$ and then left-multiplies it by the pilot contamination postcoding matrix $\bar{A}(k)$, it being understood that each row of Y corresponds to a respective terminal group. The result of each left multiplication is a vector having L elements, in which each of the elements is the recovered message-bearing symbol received on the reverse link by one of the (at most) L terminals in the k-th terminal group.

Thus, base station j recovers (at most) L symbols from each terminal group. At step 480, the base station selects the j-th symbol recovered from each terminal group. That is, the base station selects, from each terminal group, that message-bearing symbol that was destined for itself.

Although FIG. 4 describes a technique in which each base station receives the entire pilot contamination postcoding matrix $\bar{A}(k)$ from the central controller, in other implementations, each base station j receives only the j-th row of matrix $\bar{A}(k)$. In that case, the computation of step 470 involves only the j-th row of matrix $\bar{A}(k)$ and step 480 may be omitted.

Figure 5:
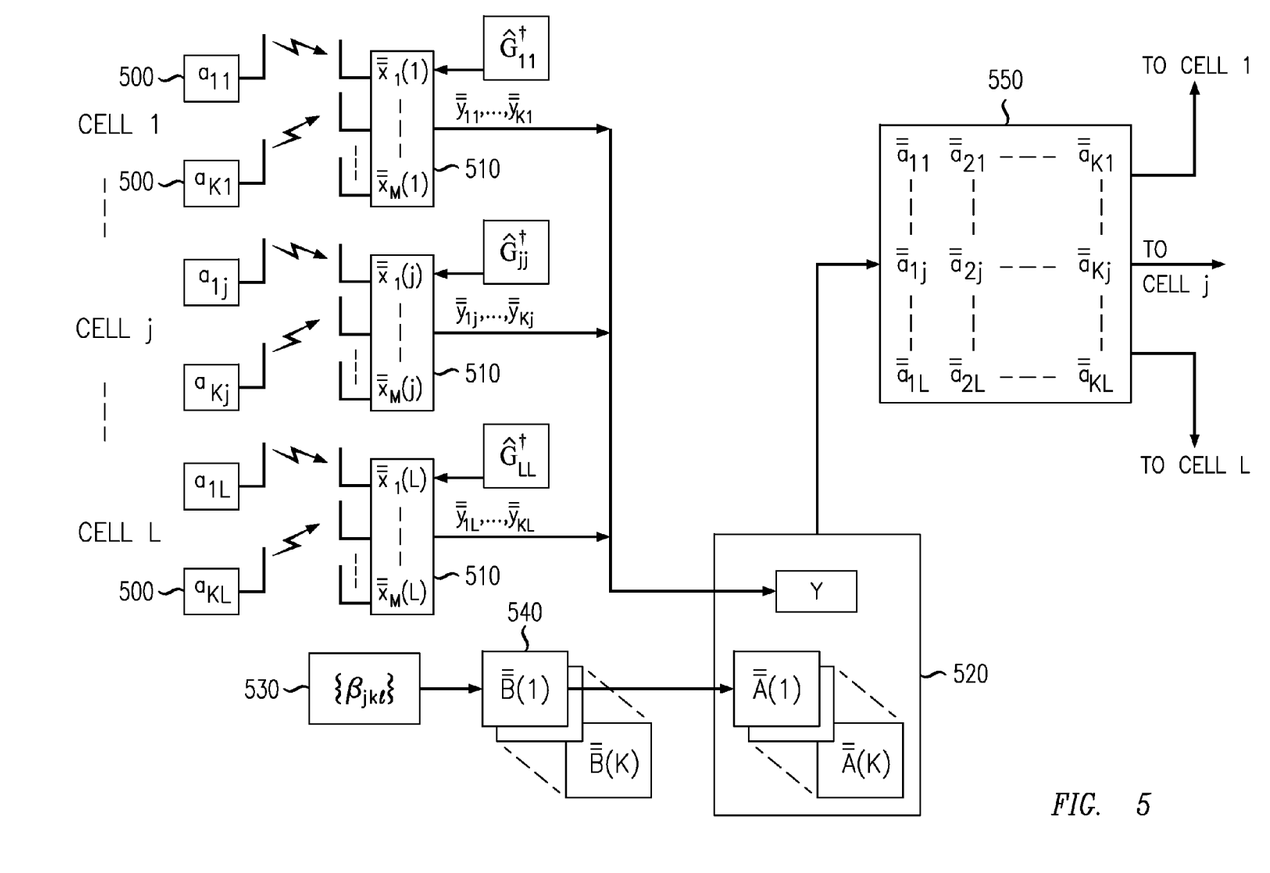
FIG. 5 is a signal flow diagram further illustrating the processing of reverse-link signals.

FIG. 5 provides another view of the processing of the reverse-link signals. As seen in the figure, terminals 500 transmit reverse-link signals, which are received as $$\bar{x}(j) = \begin{pmatrix} \bar{x}_1(j) \\ \vdots \\ \bar{x}_M(j) \end{pmatrix}$$

by base stations 510. For all j, j=1, . . . , L, the j-th base station applies, for each frequency subchannel, the conjugate transpose $\hat{G}_{jj}^\dagger$ of the respective channel matrix estimate $\hat{G}_{jj}^t$ for its own cell, thereby to obtain the K received symbols $y_{1j}, \ldots y_{Kj}$.

The received symbols are forwarded by each base station to computational block 520, where they are conceptually shown as being assembled into received signal matrix Y. (As those skilled in the art will understand, references to the matrix Y are made solely as an aid to comprehension, whereas in practice there need not be any explicit computational step of constructing matrix Y.)

The set 530 of slow-fading coefficients is provided as input to computational block 540, where the matrices $\overline{B}(k)$ are computed for all k, k=1, . . . , K. The matrices $\overline{B}(k)$ are provided as input to computational block 520, where, for all k, the pilot contamination postcoding matrices $\overline{A}(k)$ are computed.

Also at block 520, the PCP matrices $\overline{A}(k)$ operate on the received signal matrix Y to recover the message-bearing symbols $\overline{a}_{kj}$, k=1, . . . , K, j=1, . . . , L, as indicated at block 550 of the figure. As noted above, each base station may individually perform the computation to recover the message-bearing symbols.

Alternatively, the computation may be performed at a central location, and the symbols destined for each respective base station may then be forwarded to that base station. Accordingly, the figure represents the recovered symbols at block 550 as a matrix in which each row corresponds to a respective cell, and each column corresponds to a respective terminal group. As indicated in the figure, each row of the matrix is forwarded to its corresponding base station.

Improved Generation of Pilot Contamination Postcoding Matrices

The approach of the '021 publication works very well for large numbers (e.g., thousands or tens of thousands) of base station antennas, but not very well for smaller numbers (e.g., tens or hundreds) of base station antennas. In particular, the matrix-inversion technique used to form the pilot contamination postcoding matrices $\overline{A}(k)$ used in uplink signal processing in the '021 publication works much better for very large numbers of antennas than for smaller numbers.

This section describes improved techniques for generating PCP matrices for uplink signal processing. These improved techniques may work better than the matrix-inversion technique of the '021 publication for smaller numbers of base station antennas. Note that the variables used in this section may differ from those used in the previous sections. Nevertheless, each variable used in this section is explicitly defined to avoid any ambiguity.

Two different, exemplary improved techniques for generating PCP matrices are described: (i) a first improved technique to be used when the base station uses maximum ratio combining in step 440 to obtain the received uplink signal vector $\overline{y}(j)$ and (ii) a second improved technique to be used when the base station uses zero forcing in step 440 to obtain the received uplink signal vector $\overline{y}(j)$.

For the uplink, we assume that the network uses frequency reuse factor 1 and operates in TDD (Time Division Duplexing), and we consider a flat fading channel model for each OFDM subcarrier. In what follows, we omit the subcarrier index and focus on a single subcarrier. For a given subcarrier, the M×1 channel between the $k^{th}$ terminal in the $l^{th}$ cell to the BS in the $j^{th}$ cell is denoted by:

$$h_{jkl} = \sqrt{\beta_{jkl}} w_{jkl}, \tag{A1}$$

where $\beta_{jkl}$ denotes the slow-fading coefficient and depends on the terminal location and the propagation environment between the terminal and the BS, and $w_{jkl}$ denotes the fast-fading vectors comprised of i.i.d. (independent and identically distributed) entries with mean zero and variance 1, i.e., $w_{jkl} \sim \mathcal{CN}(0, I_M)$. Specifically, $\beta_{jkl}$ is i given as:

$$10 \log_{10}(\beta_{jkl}) = -127.8 - 35 \log_{10}(d_{jkl}) + X_{jkl}, \tag{A2}$$

where $d_{jkl}$ denotes the distance (in km) and $X_{jkl} \sim \mathcal{CN}(0, \pi_{shad}^2)$ is a complex normal random variable with mean zero and variance $\sigma_{shad}^2$ representing the shadowing.

We assume a time block fading model. Thus, fast-fading vectors $w_{jkl}$ stay constant during coherence interval of T OFDM symbols. These vectors are assumed to be independent in different coherence intervals. Further, we assume reciprocity between uplink and downlink channels, i.e., $\beta_{jkl}$ and $w_{jkl}$ are the same for these channels.

The TDD protocol consists of the following two steps: 1) all terminals synchronously transmit their training sequences to enable base stations to estimate the vectors $h_{jkl}$ and 2) all mobiles send uplink data signals. We consider these steps in detail below.

Uplink Channel Estimation

We assume that, in all cells, the same training codebook $\Phi \in \mathbb{C}^{K \times K}$ of orthonormal training sequences of K symbols each is used. Thus, $\Phi\Phi^H = I_K$. All terminals synchronously transmit their training sequences, and the $l^{th}$ BS receives the following signal:

$$T_l = \sum_{n=1}^{L} H_{ln} P_n^{\frac{1}{2}} \Phi + Z_l, \tag{A3}$$

where $H_{ln} = [h_{l1n} h_{l2n} \ldots h_{lKn}]$ is the concatenation of the terminal channel vectors in the $n^{th}$ cell to the BS in the $l^{th}$ cell, $P_n$ is the diagonal channel matrix of the terminal powers during the uplink training phase in the $n^{th}$ cell, and $Z_l$ is AWGN (average white Gaussian noise) and its entries are i.i.d. $\mathcal{CN}(0, 1)$ random variables.

Multiplying $T_l$ by $\Phi^H$ and extracting the $k^{th}$ column of $T_l\Phi^H$, we have:

$$r_{kl} = \sum_{n=1}^{L} h_{lkn} \sqrt{p_{kn}} + z_l, \tag{A4}$$

where $\bar{z}_l \sim \mathcal{CN}(0, I_M)$, and $P_{kn}$ is the transmit power level of the $k^{th}$ terminal of the $n^{th}$ cell.

The MMSE (minimum mean square error) estimate $\hat{h}_{lkl}$ of the channel vector $h_{lkl}$ is:

$$\hat{h}_{lkl} = E[h_{lkl} r_{kl}^H] E[r_{kl} r_{kl}^H]^{-1} r_{kl} \tag{A5}$$

$$= \frac{\beta_{lkl} \sqrt{p_{kl}}}{1 + \sum_{n=1}^{L} \beta_{lkn} p_{kn}} r_{kl}.$$

Thus, we have:

$$h_{lkl} = \hat{h}_{lkl} + e_{lkl},$$

with $e_{lkl}$ independent of $\hat{h}_{lkl}$ and $$\hat{h}_{lkl} \sim \mathcal{CN}\left(0, \frac{\beta_{lkl}^2 p_{kl}}{1 + \sum_{n=1}^{L} \beta_{lkn} p_{kn}} I_M\right),$$

$$e_{lkl} \sim \mathcal{CN}\left(0, \beta_{lkl} - \frac{\beta_{lkl}^2 p_{kl}}{1 + \sum_{n=1}^{L} \beta_{lkn} p_{kn}} I_M\right).$$

Invoking the MMSE decomposition, we can also write:

$$h_{lkm} = \hat{h}_{lkm} + e_{lkm},$$

where, using Equation (A5), we have:

$$\hat{h}_{lkm} = E\left[h_{lkm} r_{kl}^H\right] E\left[r_{kl} r_{kl}^H\right]^{-1} r_{kl} \quad (A6)$$

$$= \frac{\beta_{lkm} \sqrt{p_{km}}}{\beta_{lkl} \sqrt{p_{kl}}} \frac{\beta_{lkl} \sqrt{p_{kl}}}{1 + \sum_{n=1}^{L} \beta_{lkn} p_{kn}} r_{kl}$$

$$= \frac{\beta_{lkm} \sqrt{p_{km}}}{\beta_{lkl} \sqrt{p_{kl}}} \hat{h}_{lkl},$$

and $$e_{lkm} \sim \mathcal{CN}\left(0, \beta_{lkm} - \frac{\beta_{lkm}^2 p_{km}}{1 + \sum_{n=1}^{L} \beta_{lkn} p_{kn}} I_M\right).$$

Data Transmission

At the second step of the TDD protocol, all terminals transmit data signals. Denote by $s_{kl}$ the data signal of the $k^{th}$ terminal in the $l^{th}$ cell. Then, the $l^{th}$ BS receives the signal:

$$y_l = \sum_{n=1}^{L} \sum_{m=1}^{K} h_{lmn} \sqrt{q_{mn}} s_{mn} + z_l, \quad (A7)$$

where $q_{mn}$ is the power of the $m^{th}$ terminal in the $n^{th}$ cell, and $s_{mn}$ is the corresponding data symbol.

Uplink pilot contamination postcoding can be described as follows:
1) The $l^{th}$ BS estimates the coefficients $\beta_{lkn}$, k=1, . . . , K, n=1, . . . , L, and sends them to a controller.
2) The $l^{th}$ BS computes signals $\tilde{s}_{kl}$, k=1, . . . , K, using an M-dimensional postcoding technique such as matched filtering or zero forcing (other options are also possible) and sends them to the L−1 other base stations in the network.
3) The controller computes L×L postcoding matrices $\bar{A}_k = [a_{k1} \, a_{k2} \ldots a_{kL}]$, k=1, . . . , K, and sends $a_{kl}$ to the $l^{th}$ BS.
4) The $l^{th}$ BS forms the vectors: $\tilde{s}_k = [\tilde{s}_{k1} \, \tilde{s}_{k2} \ldots \tilde{s}_{KL}]^T$ and computes the estimates $\hat{s}_{kl} = a_{kl}^H \tilde{s}_k$, k=1, . . . , K.

The slow-fading coefficients Au are easy to estimate since they are constant over the M antennas, frequency, and over many time slots.

An M-dimensional postcoding algorithm is used for getting estimates of $s_{kl}$ from $y_l$. In particular, we can use matched filtering (aka maximum ratio combining) or zero-forcing postcoding, which choice will affect the technique used to compute the PCP matrices $\bar{A}_k$.

Matched Filtering

After matched filtering for the $k^{th}$ terminal of $l^{th}$ cell, the $l^{th}$ BS gets:

$$\tilde{s}_{kl} = \hat{h}_{lkl}^H y_l \quad (A8)$$

$$= \sum_{n=1}^{L} \hat{h}_{lkl}^H h_{lkn} \sqrt{q_{kn}} s_{kn} +$$

$$\sum_{n=1}^{L} \sum_{m \neq k} \hat{h}_{lkl}^H h_{lmn} \sqrt{q_{mn}} s_{mn} + \hat{h}_{lkl}^H z_l$$

$$= \underbrace{E\left[\hat{h}_{lkl}^H h_{lkl}\right] \sqrt{q_{kl}} s_{kl}}_{\text{Useful Term}} + \underbrace{\sum_{n=1, n \neq l}^{L} E\left[\hat{h}_{lkl}^H h_{lkn}\right] \sqrt{q_{kn}} s_{kn}}_{\text{Pilot Contamination Term}} +$$

$$\sum_{n=1}^{L} \left(\hat{h}_{lkl}^H h_{lkn} - E\left[\hat{h}_{lkl}^H h_{lkn}\right]\right) \sqrt{q_{kn}} s_{kn} +$$

$$\underbrace{\sum_{n=1}^{L} \sum_{m \neq k} \hat{h}_{lkl}^H h_{lmn} \sqrt{q_{mn}} s_{mn} + \hat{h}_{lkl}^H z_l}_{\text{Interference and Noise Terms}}.$$

The first of the three interference/noise terms in Equation (A8) is the interference caused by the effective channel uncertainty at the base station receiver. The receiver does not know the exact value of the effective channel $\hat{h}_{lkl}^H h_{lkn} \sqrt{q_{kn}}$ and replaces it by $E[\hat{h}_{lkl}^H h_{lkn}]\sqrt{q_{kn}}$. As a result, the difference $$\sum_{n=1}^{L} \left(\hat{h}_{lkl}^H h_{lkn} - E\left[\hat{h}_{lkl}^H h_{lkn}\right]\right) \sqrt{q_{kn}} s_{kn}$$

becomes a source of interference. The second interference/noise term is caused by a) estimation error of the channel vectors (instead of the true channel vector $h_{lkl}$, the base station gets an estimate $\hat{h}_{lkl}$) and b) by nonorthogonality of the channel vectors $h_{jkj}$, which, in the case of matched filtering, prevents full interference cancellation even if the true channel vector $h_{lkl}$ is available to the l-th base station. The last interference/noise term $\hat{h}_{lkl}^H z_l$ in Equation (A8) is caused by the additive noise $z_l$.

Equation (A8) shows that the power of the useful term is proportional to $E[\hat{h}_{lkl}^H h_{lkl}]^2$ and therefore is proportional to $M^2$. The powers of pilot contamination terms are also proportional to $M^2$. At the same time, the powers of all other terms are proportional only to M. Thus, in the asymptotic regime, as M tends to infinity, it is enough to cancel the pilot contamination terms since all other terms are getting negligibly small compared with the useful signal.

In pilot contamination postcoding, cooperation is organized between base stations on the level of slow-fading coefficients in order to cancel the pilot contamination terms in Equation (A8). A particular way of PCP is zero-forcing PCP (ZF PCP). It happens, however, that, in the case of M<$10^4$, all terms of Equation (A8) have comparable magnitudes with each other and, to get good performance, it is not enough to cancel only the pilot contamination terms. For this reason, ZF PCP has very bad performance, unless M is very large. The natural question is whether PCP can be designed so as to mitigate the most-significant interference terms of Equation (A8) for a given M.

Let $a_{klj}$ be the $j^{th}$ element of $a_{kl}$. It is useful to represent estimates $\hat{s}_{kl}$ as:

$$\hat{s}_{kl} = a_{kl}^H \hat{s}_k = \sum_{j=1}^{L} a_{klj}^* \tilde{s}_{kj} =$$

$$\underbrace{\sum_{j=1}^{L} a_{klj}^* \mathbb{E}\left[\hat{h}_{jkj}^H h_{jkl}\right] \sqrt{q_{kl}} \, s_{kl}}_{\text{Useful Signal}} + \underbrace{\sum_{j=1}^{L} a_{klj}^* \sum_{n=1,n\neq l}^{L} \mathbb{E}\left[\hat{h}_{jkj}^H h_{jkn}\right] \sqrt{q_{kn}} \, s_{kn}}_{\text{Pilot Contamination}} +$$

$$\underbrace{\sum_{n=1}^{L}\sum_{j=1}^{L} a_{klj}^* \left(\hat{h}_{jkj}^H h_{jkn} - \mathbb{E}\left[\hat{h}_{jkj}^H h_{jkn}\right]\right) \sqrt{q_{kn}} \, s_{kn} +}_{}$$

$$\underbrace{\sum_{n=1}^{L}\sum_{m\neq k}\sum_{j=1}^{L} a_{klj}^* \hat{h}_{jkj}^H h_{jmn} \sqrt{q_{mn}} \, s_{mn} + \sum_{j=1}^{L} a_{klj}^* \hat{h}_{jkj}^H z_j}_{\text{Interference plus Noise Terms}}.$$

It is not difficult to show that all interference and noise terms in the above expression are uncorrelated.

Theorem 1. For given PCP coefficients $a_{klj}$, the achievable SINR (signal to interference and noise ratio) for terminal k in cell l is $\text{SINR}_{kl} = N/D$, where:

$$N = \left|\sum_{j=1}^{L} a_{klj}^* \frac{\beta_{jkj}\sqrt{p_{kj}} \, \beta_{jkl}\sqrt{p_{kl}}}{1 + \sum_{i=1}^{L} \beta_{jki}\sqrt{p_{ki}}} M\right|^2 q_{kl}$$

$$D = \sum_{n=1,n\neq l}^{L} \left|\sum_{j=1}^{L} a_{klj}^* \frac{\beta_{jkn}\sqrt{p_{kn}} \, \beta_{jkj}\sqrt{p_{kj}}}{1 + \sum_{i=1}^{L} \beta_{jki}\sqrt{p_{ki}}} M\right|^2 q_{kn} +$$

$$\sum_{n=1}^{L}\sum_{m=1}^{K}\sum_{j=1}^{L} M|a_{klj}|^2 \frac{\beta_{jkj}^2 p_{kj}}{1 + \sum_{i=1}^{L} \beta_{jki} p_{ki}} \beta_{jmn} q_{mn} +$$

$$\sum_{j=1}^{L} M|a_{klj}|^2 \frac{\beta_{jkj}^2 p_{kj}}{1 + \sum_{i=1}^{L} \beta_{jki} p_{ki}}.$$

Using Theorem 1, we can find optimal PCP coefficients $a_{klj}$. To keep notations short, instead of $a_{klj}$, we will use:

$$\hat{a}_{klj} = a_{klj} \frac{\beta_{jkj}\sqrt{p_{kj}}}{1 + \sum_{i=1}^{L} \beta_{jki} p_{ki}}, \tag{A9}$$

and $$\hat{a}_{kl} = (\hat{a}_{kl1}, \ldots, \hat{a}_{klL}).$$

Theorem 2. Assuming matched filtering at Step 2) of Uplink PCP, the optimal PCP coefficients $\hat{a}_{kl}$ and the corresponding maximum SINRs are:

$$\hat{a}_{kl} = \left(\sum_{n=1,n\neq l}^{L} \beta_{kn}\beta_{kn}^H p_{kn} q_{kn} M + \Lambda_k\right)^{-1} \beta_{kl} \tag{A10}$$

-continued $$\text{SINR}_{kl} = \beta_{kn}^H \left(\sum_{n=1,n\neq l}^{L} \beta_{kn}\beta_{kn}^H p_{kn} q_{kn} M + \Lambda_k\right)^{-1} \beta_{kl} p_{kl} q_{kl} M, \tag{A11}$$

where $\beta_{kn} = [\beta_{1kn} \ldots \beta_{Lkn}]^T$ and $\Lambda_k = \text{diag}(\lambda_{1k}, \ldots, \lambda_{Lk})$ with:

$$\lambda_{jk} = \left(1 + \sum_{i=1}^{L} \beta_{jki} p_{ki}\right)\left(1 + \sum_{n=1}^{L}\sum_{m=1}^{K} \beta_{jmn} q_{mn}\right). \tag{A12}$$

It is interesting to note that the postcoding vector $\hat{a}_{kl}$ that maximizes the SINR of terminal k in cell l can be computed independently of the other postcoding vectors.

Zero Forcing

As described above, instead of matched filtering, the base stations can use zero forcing to obtain the received uplink signal vectors. In that case, for the $l^{th}$ BS, we have:

$$V_l = \hat{H}_{ll}(\hat{H}_{ll}^H \hat{H}_{ll})^{-1} \text{ and } \tilde{s}_{kl} = v_{lk}^H y_l, \tag{A13}$$

where $v_{lk}$ is the $k^{th}$ column of $V_l$. Then we have the following Theorem 3.

Theorem 3. If zero-forcing M-dimensional postcoding is used at Step 2) of Uplink PCP, then the optimal PCP coefficients $\hat{a}_{kl}$ and corresponding maximum SINRs are defined as in Equations (A10) and (A11) of Theorem 2 with:

$$\lambda_{jk} = \frac{M}{M-K}\left(1 + \sum_{i=1}^{L} \beta_{jki} p_{ki}\right) \times \tag{A14}$$

$$\left(1 + \sum_{n=1}^{L}\sum_{m=1}^{K}\left[\beta_{jmn} - \frac{\beta_{jmn}^2 p_{mn}}{1 + \sum_{i=1}^{L} \beta_{jmi} p_{mi}}\right] q_{mn}\right).$$

Note that, for both matched filtering and zero forcing, the PCP matrices are generated taking into account the slow-fading coefficients $\beta$ as well as the pilot and data transmit power levels p and q of the terminals.

Numerical Results

We assumed L=19 cells (wrapped into a torus) of radius 1 km, K=5, and M=100. For decentralized PCP, we set L'=7. The maximum transmit power of each terminal during the pilot and data transmission phase is set to $P_{max} = Q_{max} = 200$ mW, and the slow-fading coefficients $\beta_{jkl}$ are computed according to Equation (2), with $\sigma_{shad}^2 = 8$ dB.

In addition to the results presented in Theorems 1-3, we also derived SINR expressions for scenarios where the base stations cooperate by sharing between themselves all the channel state information. We considered the case when base stations have access to the actual $h_{jkl}$ (Full Cooperation Perfect CSI) and when they can have only $\hat{h}_{jkl}$ defined in Equation (5) (Full Cooperation Imperfect CSI).

We observed a 62.5-fold increase in the 5% outage rates when going from no PCP to PCP with matched filtering. When the BS uses PCP in conjunction with zero forcing, a 140-fold increase is observed, showing that the obtained gains are truly significant. It is also remarkable to see that PCP with zero forcing performs close to full cooperation with imperfect CSI.

We also determined the fraction of terminals achieving a certain target SINR for varying target SINRs with PCP and matched filtering. Again, by looking at the 5% outage rates, we observed a 16 dB gain on going from PCP to PCP with transmit power optimization, obtained by solving Equation (A21) using the algorithm of the section entitled Distributed PCP with Power Optimization and replacing $SINR_{kl,loc}$, with $SINR_{kl}$), and saw only a minor 0.5 dB loss in going from PCP to decentralized PCP.

In general, the improved techniques of this disclosure may provide better results than the prior-art matrix-inversion technique for systems having more than four antennas per base station. As the number of base station antennas increases, the performance of the matrix-inversion technique will approach the performance of the present improved techniques.

Although the present disclosure has been described in the context of using the M-dimensional postcoding techniques of matched filtering and zero forcing to generate the estimated uplink signals, those skilled in the art will understand that other types of M-dimensional postcoding techniques can be used, such as minimum mean square error M-dimensional postcoding.

As described previously, the technique used to generate the PCP matrices depends on the type of M-dimensional postcoding used to generate the estimated uplink signals. As such, a wireless cellular network may be designed by selecting a particular M-dimensional postcoding technique and then designing a PCP matrix generation technique based on the selected M-dimensional postcoding technique.

Various of the mathematical computations described above, including the computation of the pilot contamination postcoding matrix, may be performed by digital processors situated at individual base stations, or by digital processors situated at a central unit, or by a combination of digital processors situated in various ways. Without limitation, the digital processor may be any of general or special purpose digital computers, microprocessors, digital signal processors, or the like, acting under controls embodied in software, firmware, or hardware.

It will be understood that various approximations and alternative algorithms and mathematical formulations not explicitly described above may be used in implementations, without departing from the principles described above. Not least of these would be the setting of certain quantities, such as measured values of propagation coefficients, to zero if their values lie below an appropriate threshold.

It should also be understood that we have used the term "cell" in a broad sense to mean a cell, a sector, or any similar defined reception area within a wireless network.

What is claimed is:

1. A method for uplink signal processing in a cellular wireless network having a plurality of cells, each cell having a base station with a plurality of antennas, the method comprising:
   (a) generating slow-fading coefficients for terminals in the wireless network;
   (b) generating postcoding matrices based on the slow-fading coefficients and terminal transmit power levels;
   (c) receiving uplink signals from the terminals;
   (d) performing M-dimensional postcoding to generate estimated uplink signals from the received uplink signals, where M is the number of antennas at a base station of the wireless network; and
   (e) applying the postcoding matrices to the estimated uplink signals to reduce interference.

2. The invention of claim 1, wherein the postcoding matrices are generated based on both terminal pilot transmit power levels and terminal data transmit power levels.

3. The invention of claim 1, wherein the M-dimensional postcoding involves either matched filtering or zero forcing.

4. The invention of claim 3, wherein the postcoding matrices are generated according to:

$$\hat{a}_{kl} = \left( \sum_{n=1, n \neq l}^{L} \beta_{kn} \beta_{kn}^H p_{kn} q_{kn} M + \Lambda_k \right)^{-1} \beta_{kl},$$

where:

$$\hat{a}_{klj} = a_{klj} \frac{\beta_{jkj} \sqrt{p_{kj}}}{1 + \sum_{i=1}^{L} \beta_{jki} q_{ki}},$$

$\hat{a}_{kl}$ is a vector of coefficients corresponding to a column $a_{kl}$ of a postcoding matrix corresponding to terminal k in cell l;

$a_{klj}$ is the postcoding coefficient for terminal k in cell l to base station j;

$\beta_{jki}$ is the slow-fading coefficient for terminal k in cell i to base station j;

L is the number of cells and base stations in the network;

$\beta_{kn}$ is a vector of slow-fading coefficients for terminal k in cell n to the L base stations of the network;

$p_{kn}$ is a pilot transmit power level for terminal k in cell n;

$q_{kn}$ is a data transmit power level for terminal k in cell n; and $\Lambda_k$ is a diagonal coefficient matrix for terminal k.

5. The invention of claim 4, wherein the M-dimensional postcoding involves matched filtering.

6. The invention of claim 5, wherein the diagonal coefficient matrix $\Lambda_k$ is generated according to:

$$\lambda_{jk} = \left( 1 + \sum_{i=1}^{L} \beta_{jki} p_{ki} \right) \left( 1 + \sum_{n=1}^{L} \sum_{m=1}^{K} \beta_{jmn} q_{mn} \right),$$

where:

$\lambda_{jk}$ is the $j^{th}$ diagonal coefficient for terminal k;

$\beta_{jki}$ is the slow-fading coefficient from terminal k in cell i to base station j; and K is the number of terminals in cell j.

7. The invention of claim 5, wherein the estimated uplink signals $\tilde{s}_{kl}$ for terminal k of cell l are generated according to:

$$\tilde{s}_{kl} = \hat{h}_{lkl}^H y_l,$$

where:

$\hat{h}_{lkl}$ is a channel vector for terminal k in cell l to base station l; and $y_l$ is a vector of received uplink signals at base station l.

8. The invention of claim 4, wherein the M-dimensional postcoding involves zero forcing.

9. The invention of claim 8, wherein the diagonal coefficient matrix $\Lambda_k$ is generated according to:

$$\lambda_{jk} = \frac{M}{M-K} \left( 1 + \sum_{i=1}^{L} \beta_{jki} p_{ki} \right) \times \left( 1 + \sum_{n=1}^{L} \sum_{m=1}^{K} \left[ \beta_{jmn} - \frac{\beta_{jmn}^2 p_{mn}}{1 + \sum_{i=1}^{L} \beta_{jmi} p_{mi}} \right] q_{mn} \right)$$

where:

$\lambda_{jk}$ is the $j^{th}$ diagonal coefficient for terminal k;

$\beta_{jki}$ is the slow-fading coefficient from terminal k in cell i to base station j; and K is the number of terminals in cell j.

10. The invention of claim 8, wherein the estimated uplink signals $\tilde{s}_{kl}$ for terminal k of cell l are generated according to:

$$V_l = \hat{H}_{ll}(\hat{H}_{ll}^H \hat{H}_{ll})^{-1} \text{ and } \tilde{s}_{kl} = v_{lk}^H y_l,$$

where:
- $\hat{H}_{ll}$ is a matrix of channel vectors for the terminals in cell l to base station l;
- $v_{lk}$ is the $k^{th}$ column of matrix $V_l$; and
- $y_l$ is a vector of received uplink signals at base station l.

11. The invention of claim 1, wherein:
- step (a) is implemented at one or more controllers of the wireless network;
- step (b) is implemented at the base stations or the one or more controllers;
- step (c) is implemented at the base stations;
- step (d) is implemented at the base stations; and
- step (e) is implemented at the base stations.

12. The invention of claim 1, wherein M is greater than 4.

13. A cellular wireless network comprising a plurality of cells, each cell having a base station with a plurality of antennas, wherein one or more processing modules of the wireless network are configured to:
  (a) generate slow-fading coefficients for terminals in the wireless network;
  (b) generate postcoding matrices based on the slow-fading coefficients and terminal transmit power levels;
  (c) receive uplink signals from the terminals;
  (d) perform M-dimensional postcoding to generate estimated uplink signals from the received uplink signals, where M is the number of antennas at a base station of the wireless network; and
  (e) apply the postcoding matrices to the estimated uplink signals to reduce interference.

14. The invention of claim 13, wherein the postcoding matrices are generated based on both terminal pilot transmit power levels and terminal data transmit power levels.

15. The invention of claim 13, wherein the M-dimensional postcoding involves either matched filtering or zero forcing.

16. The invention of claim 15, wherein the postcoding matrices are generated according to:

$$\hat{a}_{kl} = \left( \sum_{n=1, n \neq l}^{L} \beta_{kn} \beta_{kn}^H p_{kn} q_{kn} M + \Lambda_k \right)^{-1} \beta_{kl},$$

where:

$$\hat{a}_{klj} = a_{klj} \frac{\beta_{jkj} \sqrt{p_{kj}}}{1 + \sum_{i=1}^{L} \beta_{jki} q_{ki}},$$

- $\hat{a}_{kl}$ is a vector of coefficients corresponding to a column $a_{kl}$ of a postcoding matrix corresponding to terminal k in cell l;
- $a_{klj}$ is the postcoding coefficient for terminal k in cell l to base station j;
- $\beta_{jki}$ is the slow-fading coefficient for terminal k in cell i to base station j;
- L is the number of cells and base stations in the network;
- $\beta_{kn}$ is a vector of slow-fading coefficients for terminal k in cell n to the L base stations of the network;
- $p_{kn}$ is a pilot transmit power level for terminal k in cell n;
- $q_{kn}$ is a data transmit power level for terminal k in cell n; and
- $\Lambda_k$ is a diagonal coefficient matrix for terminal k.

* * * * *